United States Patent
Amann et al.

(10) Patent No.: US 6,720,746 B2
(45) Date of Patent: Apr. 13, 2004

(54) METHOD AND REGULATING SYSTEM FOR DAMPING THE TORQUE OSCILLATIONS OF THE DRIVE TRAIN OF AN ELECTRICALLY DRIVEN ROAD VEHICLE

(75) Inventors: Notker Amann, Friedrichshafen (DE); Joachim Boecker, Berlin (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/235,861

(22) Filed: Sep. 6, 2002

(65) Prior Publication Data

US 2003/0062859 A1 Apr. 3, 2003

(30) Foreign Application Priority Data

Sep. 7, 2001 (DE) .......................... 101 45 891

(51) Int. Cl.⁷ .................. H02P 7/00; G05B 11/01
(52) U.S. Cl. ............... 318/114; 318/432; 180/65.1; 180/65.6
(58) Field of Search ............... 180/65.01, 65.05, 180/65.07, 65.08; 318/37, 38, 114, 432, 434, 460, 461, 558; 310/51

(56) References Cited

U.S. PATENT DOCUMENTS

| | | | |
|---|---|---|---|
| 5,455,469 A | * 10/1995 | Ward | 307/141.4 |
| 5,534,764 A | * 7/1996 | Masaki et al. | 318/802 |
| 5,821,720 A | 10/1998 | Deng et al. | 318/630 |
| 5,994,859 A | 11/1999 | Deng et al. | 318/432 |
| 6,102,144 A | * 8/2000 | Lutz | 180/65.2 |
| 6,574,535 B1 | * 6/2003 | Morris et al. | 701/22 |

OTHER PUBLICATIONS

Marcus Menne, Dissertation, RWTH Aachen, 2001, Wissenshaftsverlag Mainz.

* cited by examiner

Primary Examiner—Burton S. Mullins
Assistant Examiner—Judson H. Jones
(74) Attorney, Agent, or Firm—Crowell & Moring LLP

(57) ABSTRACT

In the present method for damping the torque oscillations of the drive train of an electrically driven road vehicle, the torque or a torque estimated value and the rotational speed of the electric motor which drives the road vehicle as well as the rotational speed of a wheel or the mean value of the rotational speeds of all the driven wheels of the road vehicle are detected as input variables, an observer estimating, from the input variables, the torque which is transmitted to the wheels by the gear mechanism, a regulating block which is connected downstream of the observer determining a compensation torque from the estimated torque, and the compensation torque being added to the setpoint torque of the electric motor, as a result of which a regulating circuit is obtained. By means of these measures, a travel characteristic which is significantly improved for the driver is achieved and the material loading in the drive train is reduced.

21 Claims, 1 Drawing Sheet

METHOD AND REGULATING SYSTEM FOR DAMPING THE TORQUE OSCILLATIONS OF THE DRIVE TRAIN OF AN ELECTRICALLY DRIVEN ROAD VEHICLE

BACKGROUND AND SUMMARY OF THE INVENTION

The invention relates to a method and a regulating system for damping the torque oscillations of the drive train of an electrically driven road vehicle.

An important problem associated with the drive trains of electrically driven road vehicles is the oscillations caused by the elasticity and gear play in the mechanical connections. The oscillations have a material-fatiguing effect on the vehicle components and reduce passenger comfort.

The fundamental task of the drive system is to transmit the torque requested by the driver to the wheels. Because of the elasticity and play of the drive train components, unless suitable suppression is carried out resonant phenomena always occur as the natural damping of an electric drive is very low.

Various methods for damping the oscillations are known from the prior art. U.S. Pat. Nos. 5,821,720 and 5,994,859 disclose, for example, simple damping methods which use only motor measurement variables as input variables. As a result, the damping is inadequate and depends, undesirably, on the operating point.

Furthermore, in Marcus Menne, Dissertation, RWTH Aachen, 2001, Wissenschaftsverlag Mainz, a method for damping using further parameters as input variables is disclosed which likewise depends on the operating point.

The invention is thus based on an object of developing a method for damping the torque oscillations of the drive train of an electrically driven road vehicle which ensures adequate damping and has a travel characteristic which is significantly better than the prior art. In addition, a regulating system for carrying out the method is to be developed.

The first-mentioned object is achieved by a method of the present invention in which the torque (or an estimated value) and the rotational speeds of the electric motor which drives the vehicle and of one or more wheels of the vehicle are detected as input variables. In addition, an observer estimates, from the input variables, the torque which is transmitted to the wheels by the gear mechanism. Further, a regulating block which is connected downstream of the observer determines a compensation torque from the estimated torque, and the compensation torque is added to the setpoint torque of the electric motor. All of this results in a regulating circuit.

With the present method, the drive train oscillations are effectively damped. The method functions at all relevant operating points. It leads to a significantly better travel characteristic which has the effect of improving passenger comfort. The achieved damping of the torque oscillations places significantly less mechanical loading on the drive train. As a result, the material fatigue of the drive train is significantly reduced, and its service life prolonged.

In particular, when the torque transmitted to the wheels by the gear mechanism drops below a predefined threshold value, the regulating system may be switched off after a predefined time delay, and not switched on again until the threshold value is exceeded. The regulating system is preferably switched off when the vehicle is stationary. A logic unit which switches off the regulator when the torque is very small or none is added. In this configuration, no compensation torque is generated. If the requested torque is of the same order of magnitude as the noise level, it is more advantageous not to add a compensation torque to the setpoint torque of the electric motor.

In a further refinement of the invention, the regulating system is active only if the values for the compensation torque are in a predefined interval. As a result, functional errors in extremely unusual travel situations are avoided. Sensor errors or failures can thus also be taken into account. Unstable operating methods are completely ruled out by the specified variants.

Other objects, advantages and novel features of the present invention will become apparent from the following detailed description of the invention when considered in conjunction with the accompanying drawings.

DETAILED DESCRIPTION OF THE DRAWINGS

Figure 1:
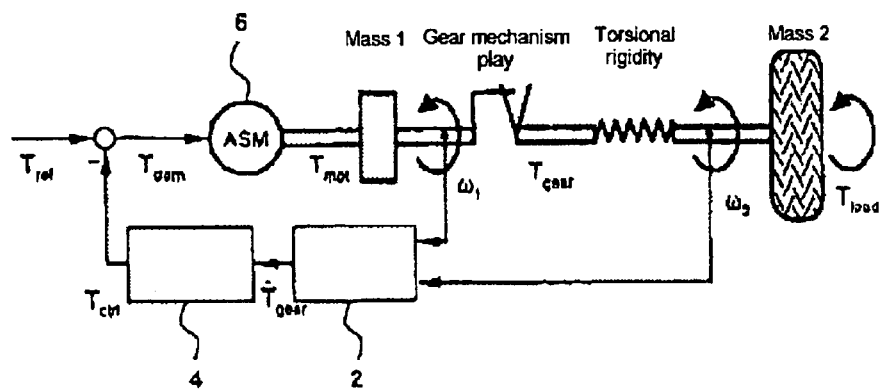
FIG. 1 shows a block diagram of a regulating system for damping the torque oscillations of the drive train of an electrically driven road vehicle with a controller in a schematic view. The controller comprises an observer 2 and a regulating block 4.

According to FIG. 1, the torque and the rotational speed of the electric motor 6 which drives the vehicle, and the rotational speed of the wheels of the vehicle, are detected as input variables for the observer 2. The motor torque does not need to be detected by a sensor. An estimated value from a conventional subordinate motor regulating system is sufficient. Either the measured value of one wheel, or advantageously the mean value of the rotational speeds of all the wheels, is used as the wheel speed. The observer 2 estimates, from the input variables, the torque which is transmitted to the wheels by the gear mechanism, for which it uses a dynamic model of the drive train which has three status variables. The simplified model proves very robust and requires relatively little computing time.

A regulatory 4 which is connected downstream of the observer 2 uses the estimated gear mechanism torque as input variable and determines a compensation torque from it. The regulator 4 shows a differentiating characteristic. The compensation torque is added to the setpoint torque of the electric motor 6.

The controller thus regulates the controlled system between the requested torque and the torque transmitted by the gear mechanism. The first part to be considered is the transmission characteristic of the requested torque $T_{dem}(s)$ with respect to the torque $T_{mot}(s)$ of the electric motor 6. This is described approximately by a second-order system $$\frac{T_{mot}(s)}{T_{dem}(s)} = \frac{1}{\tau_{ASM}^2 s^2 + \sqrt{2}\,\tau_{ASM} s + 1} \tag{1}$$

or by a first-order system $$\frac{T_{mot}(s)}{T_{dem}(s)} = \frac{1}{\tau_{ASM} s + 1} \tag{2}$$

with the time constant $\tau_{ASM}$.

The second part comprises the transmission characteristic of the motor torque with respect to the gear mechanism torque. This includes the non-linearity of the gear mechanism, namely the gear mechanism play characteristic.

Figure 2:
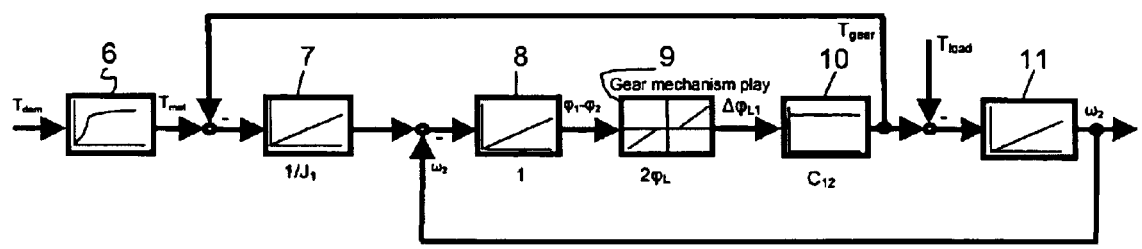
FIG. 2 shows a system model of the drive train in a schematic view.

FIG. 2 illustrates the model to be described in a block diagram, in which the first box 6 represents the relationship between the demanded motor torque $T_{dem}$ and actual motor torque $T_{mot}$, the second box 7 represents the relationship between the torques on the motor shaft and the motor speed $\omega_1$, the third box 8 represents the relationship between the wheel and motor speed difference and wheel and motor position difference, the fourth box 9 represents the gear mechanism play, the fifth box 10 represent the effect of gear mechanism play on the output torque $T_{gear}$ of the gear mechanism, and the sixth box 11 represents the relationship between the torques on the wheel and the wheel speed $\omega_2$. When the gear mechanism play is neglected, the following is obtained as a linear transmission function $$\frac{T_{gear}(s)}{T_{mot}(s)} = \frac{C_{12}J_2}{J_1J_2s^2 + d_{12}(J_1+J_2)s + C_{12}(J_1+J_2)} = \frac{\frac{J_2}{J_1+J_2}}{\left(\frac{s}{\Omega_{01}}\right)^2 + 2d'_{12}\left(\frac{s}{\Omega_{01}}\right) + 1}. \quad (3)$$

with the inertia moments $J_1$ and $J_2$ of the masses 1 and 2 and the frequency constant $\Omega_{01}$ and the damping constant $d'_{12}$. $\Omega_{01}$ and $d'_{12}$ are defined as $$\Omega_{01} = \sqrt{C_{12}J_1 + \frac{J_2}{J_1J_2}} \; ; \; d'_{12} = \frac{\Omega_{01}d_{12}}{2C_{12}}. \quad (4)$$

The equations (1) or (2) together with (3) and (4) thus describe the system to be regulated. With the load torque there is additionally interference which is proportional to the traction torque. Although the load torque is part of the overall system, it is not explicitly contained in the model and must therefore be treated as an additional interference. The interference $T_{load}$ influences the gear mechanism torque in the following way $$\frac{T_{gear}(s)}{T_{load}(s)} = \frac{C_{12}J_1}{J_1J_2s^2 + d_{12}(J_1+J_2)s + C_{12}(J_1+J_2)} = \frac{\frac{J_1}{J_1+J_2}}{\left(\frac{s}{\Omega_{01}}\right)^2 + 2d'_{12}\left(\frac{s}{\Omega_{01}}\right) + 1}. \quad (5)$$

The advantage of controlling the gear mechanism torque $T_{gear}$ with the present model is that the dynamics of the vehicle neither have to be modelled nor have to be included in the system model. Taking into account the vehicle dynamics would significantly extend the model with more parameters and uncertainties in the modelling. The simplified modelling used here can be handled more simply.

When the torque transmitted to the wheels by the gear mechanism drops below a predefined threshold value, the regulating system is switched off after a predefined time delay, and not switched on again until the threshold value is exceeded. A logic unit which switches off the regulating block when the torque is very small or none is added. In this case, no compensation torque is generated.

The regulating system is also active only if the values for the compensation torque are in a predefined interval. As a result, functional errors in extremely unusual travel situations are avoided. Sensor errors or failures can thus also be taken into account. Unstable operating methods are completely ruled by the specified variants.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for damping torque oscillations of a drive train of an electrically driven vehicle, the method comprising:

the torque or alternatively a torque estimated value of the electric motor which drives the road vehicle, the rotational speed of the electric motor and the rotational speed of a wheel or the mean value of the rotational speeds of all the driven wheels of the road vehicle are detected as input variables, an observer estimates, from the input variables, the torque which is transmitted to the wheels by the gear mechanism, a regulator which is connected downstream of the observer determines a compensation torque from the estimated torque, and the compensation torque is added to the setpoint torque of the electric motor.

2. The method according to claim 1, wherein the regulator has a differentiating characteristic.

3. The method according to claim 2, wherein, when the torque transmitted to the wheels by the gear mechanism drops below a predefined threshold value, the regulator is switched off after a predefined time delay, and is not switched on again until the threshold value is exceeded.

4. The method according to claim 3, wherein the regulator is switched off when the vehicle is stationary.

5. The method according to claim 3, wherein the regulator is active only if the values for the compensation torque are in a predefined interval.

6. The method according to claim 1, wherein, when the torque transmitted to the wheels by the gear mechanism drops below a predefined threshold value, the regulator is switched off after a predefined time delay, and is not switched on again until the threshold value is exceeded.

7. The method according to claim 6, wherein the regulator is switched off when the vehicle is stationary.

8. The method according to claim 6, wherein the regulator is active only if the values for the compensation torque are in a predefined interval.

9. The method according to claim 1, wherein the regulator is active only if the values for the compensation torque are in a predefined interval.

10. A method for damping torque oscillations of a drive train of an electrically driven vehicle, the method comprising:

determining the torque and rotational speed of the electric motor and the wheel rotational speed;

using an observer to estimate the torque transmitted to the vehicle's wheels by a gear mechanism of the vehicle from the torque and rotational speed of the electric motor and the wheel rotational speed;

connecting a regulator to the observer to receive the estimated torque and using the regulator to determine a compensation torque from the estimated torque, and adding the compensation torque to a setpoint torque of the electric motor.

11. The method according to claim 10, further comprising determining the wheel rotational speed from the speed of one of the vehicle's wheels.

12. The method according to claim 10, further comprising determining the wheel rotational speed from the mean value of the rotational speeds of all the vehicle's wheels.

13. The method according to claim 10, wherein the regulator has a differentiating characteristic.

14. The method according to claim 13, further comprising, when the torque transmitted to the wheels by the gear mechanism drops below a threshold value, switching off the regulator after a time delay and not switching on the regulator until the torque transmitted to the wheels by the gear mechanism exceeds the threshold value.

15. The method according to claim 14, further comprising switching off the regulator when the vehicle is stationary.

16. The method according to claim 14, further comprising switching on the regulator only if the compensation torque is in a predefined interval.

17. A system for damping torque oscillations of a drive train of an electrically driven vehicle, the system comprising:

an observer that estimates the torque transmitted to the vehicle's wheels by a gear mechanism of the vehicle from the torque and rotational speed of the electric motor and the wheel rotational speed; and a regulator connected to the observer, the regulator receiving the estimated torque and determining a compensation torque from the estimated torque, wherein the compensation torque is added to a setpoint torque of the electric motor.

18. The system according to claim 17, wherein the regulator has a differentiating characteristic.

19. The system according to claim 18, wherein when the torque transmitted to the wheels by the gear mechanism drops below a threshold value, the regulator is switched off after a time delay and not switched on until the torque transmitted to the wheels by the gear mechanism exceeds the threshold value.

20. The system according to claim 19, wherein the regulator is switched off when the vehicle is stationary.

21. The system according to claim 19, wherein the regulator is switched on only if the compensation torque is in a predefined interval.

* * * * *